B. E. FERNOW, Jr.
ELECTROMAGNETICALLY CONTROLLED BRAKE.
APPLICATION FILED MAR. 14, 1917.

1,338,980.

Patented May 4, 1920.

Inventor
Bernard E. Fernow Jr.
By Frank W. Hubbard
Attorney

UNITED STATES PATENT OFFICE.

BERNARD E. FERNOW, JR., OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTROMAGNETICALLY-CONTROLLED BRAKE.

1,338,980.     Specification of Letters Patent.     Patented May 4, 1920.

Application filed March 14, 1917. Serial No. 154,821.

*To all whom it may concern:*

Be it known that I, BERNARD E. FERNOW, Jr., a citizen of the United States, residing at Milwaukee, in the county of Milwaukee and State of Wisconsin, have invented new and useful Improvements in Electromagnetically-Controlled Brakes, of which the following is a full, clear, concise, and exact description, reference being had to the accompanying drawing, forming a part of this specification.

This invention relates to electromagnetically controlled brakes and the like, and though not limited thereto, is particularly applicable to devices of the multiple disk type.

An object of the invention is to provide a mechanism for the aforesaid and other purposes which may be more readily and expeditiously adjusted, and the adjustment of which may be effected without disassembling or disconnecting any portion thereof, and without opposition by the energy of the spring or of the electromagnet employed.

Other objects and advantages will hereinafter appear.

Figure 1:
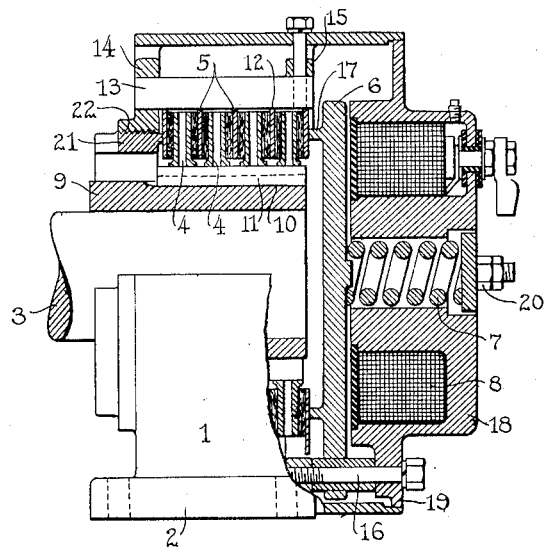
Figure 2:
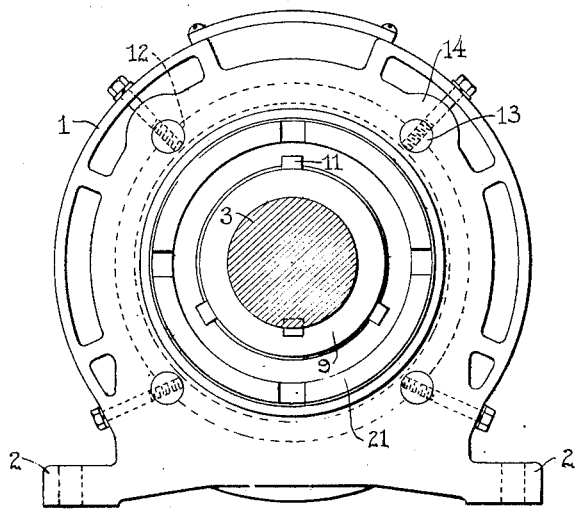

Referring to the drawing, wherein is illustrated a preferred embodiment of the invention, Figure 1 is a side elevational view thereof, certain parts being shown in section; while Fig. 2 is an end elevation of the casing.

Referring to the drawing, the brake illustrated comprises in general a casing 1 having lugs 2 to be secured to a fixed support, a shaft 3 to be braked projecting within said casing, and series of alternately arranged rotatable and non-rotatable friction disks 4, 5, the former being movable with the shaft and the latter held by the casing, a magnetic plate 6 adjacent said disks and biased to force the same into engagement by a spring 7, and a magnetic winding 8, adapted when energized to attract said plate and thereby relieve said disks of the pressure of said spring.

The disks 4 are arranged for rotation with the shaft 3 by means of a collar 9 keyed upon said shaft and having exteriorly located keyways 10 containing keys or feathers 11 which also engage within suitable loose keyways or recesses in said disks, whereby the latter are constrained to rotate with the shaft but are free to reciprocate relatively thereto. The disks 5 are of larger diameter than said rotatable disks and are provided therebeyond with suitable openings 12 for loose mounting upon a series of axially extending studs 13 which are fixed within suitable head members 14, 15 of the casing. By the above construction the stationary disks are held against rotation relative to the casing but are permitted a limited reciprocation with respect thereto. In practice the engaging surfaces of the aforesaid disks are preferably lined with suitable wear resisting material and the first and last disks of the series are preferably non-rotatable.

The magnetic plate 6 is loosely mounted upon a series of fixed axially extending studs 16 for reciprocation with respect to the casing, said plate having projecting portions 17 adapted to engage the adjacent stationary disk 5 during braking action.

The spring 7 and the magnet winding 8, both of which act upon the plate 6, are carried within a suitable head member 18 of magnetic material, said member having a flange 19 to be inset within the outer edge of the casing whereby the inner edge of the spring, as well as the inner edge of the winding, are arranged adjacent the plate 6. The head member 18 being secured in place in the relation above described, the spring 7 tends to force said plate toward and against the friction rings causing engagement and braking action thereof, the tension of said spring being regulable by suitable adjusting means 20 carried by said head.

For compensating the wear of the friction liners and the consequent lengthening of the air gap between the plate 6 and its winding, an annular abutment member 21 is threaded within the shaft opening 22 of the head member 14 to engage the outer non-rotatable friction disk 5, said abutment member being preferably of reduced thickness at its inner end and preferably having its outer end notched to facilitate turning thereof.

To effect the aforesaid adjustment, the magnet winding is preferably first energized for relieving the disks of spring pressure, whereupon the abutment member may readily be screwed within the head, thereby sliding said rings toward the winding for reducing the air gap by the desired amount, said action serving further to restore the proper adjustment of the spring 7.

The area of engagement between the abutment member and the disk 5 being reduced and the diameter of said member being also relatively small, it is apparent that the friction incident to turning thereof is minimized, whereby, when necessary, adjustment may be effected even during engagement of the brake.

It is therefore obvious that the adjustment means aforedescribed is readily operable under all service conditions of the brake and without disassembling or disconnecting any portion thereof or disturbing any permanent adjustment.

What I claim as new and desire to secure by Letters Patent is:

1. In an electromagnetically controlled brake or the like, in combination, a casing, an electromagnet fixed thereto, a plurality of friction disks mounted within said casing, an armature member to be attracted by said electromagnet also mounted within said casing, means biasing said armature member away from said electromagnet and against said disks for causing forcible engagement of the latter, and an adjustable stop member carried within a portion of said casing and extending therebeyond, said member being movable for varying relation of said disks and said armature member to said electromagnet.

2. In an electromagnetically controlled brake or the like, in combination, a casing, an electromagnet rigidly secured therewithin, a plurality of friction disks and an armature member located within said casing, means normally acting upon said armature member for causing forcible engagement of said disks, said electromagnet being effective for causing release of said disks by said armature and an adjustable stop member coöperating with an integral portion of said casing and movable to shift said disks and said armature relatively to said electromagnet.

3. In an electromagnetically controlled brake or the like, in combination, a casing, an electromagnet fixed thereto, a plurality of friction disks mounted within said casing, an armature member for said electromagnet, a spring biasing said armature member away from said electromagnet and against said disks for causing forcible engagement of the latter, and an adjustable stop member for said disks movable to force the same toward said electromagnet for varying the play of said armature relative thereto and restoring the normal tension of said spring.

4. In an electromagnetically controlled brake or the like in combination, a casing, an electromagnet rigidly secured therewithin, a plurality of friction disks carried within said casing, an armature for said electromagnet also contained within said casing, means biasing said electromagnet and said armature member apart and means carried by said casing and operable during attraction of said armature by said electromagnet for adjusting the play of the former with respect to the latter when released therefrom.

5. In an electromagnetically controlled brake or the like, in combination, a casing, an electromagnet rigidly secured therewithin, an armature member for said electromagnet, means biasing said armature away from said electromagnet, disks subjected to the pressure of said armature member under its bias and an adjustable attachment coöperating with said casing and operable during attraction of said armature by said electromagnet for adjusting the biased play of the former with respect to the latter when released therefrom.

In witness whereof I have hereunto subscribed my name.

BERNARD E. FERNOW, Jr.